(12) United States Patent
Lin

(10) Patent No.: US 8,622,636 B2
(45) Date of Patent: Jan. 7, 2014

(54) OPTICAL FIBER CONNECTOR

(75) Inventor: I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 372 days.

(21) Appl. No.: 13/214,261

(22) Filed: Aug. 22, 2011

(65) Prior Publication Data

US 2012/0328245 A1    Dec. 27, 2012

(30) Foreign Application Priority Data

Jun. 24, 2011    (TW) .............. 100122095 A

(51) Int. Cl.
*G02B 6/36*    (2006.01)

(52) U.S. Cl.
USPC .............. 385/89; 385/88; 385/91; 385/93

(58) Field of Classification Search
None
See application file for complete search history.

(56) References Cited

U.S. PATENT DOCUMENTS

2011/0142401 A1 *   6/2011   Lin et al. .................. 385/77

* cited by examiner

*Primary Examiner* — Uyen Chau N Le
*Assistant Examiner* — Chad Smith
(74) *Attorney, Agent, or Firm* — Altis Law Group, Inc.

(57) ABSTRACT

An optical fiber connector includes optical fibers, a connector body, two first glue layers, and two second glue layers. The optical fibers are received in grooves and aligned with optical lenses formed on the connector body. The first and second glue layers fill in the recesses to hold the main portion and the front portion of the optical fibers securely in place.

6 Claims, 3 Drawing Sheets

OPTICAL FIBER CONNECTOR

BACKGROUND

1. Technical Field

The present disclosure relates to optics and, particularly, to an optical fiber connector.

2. Description of Related Art

An optical fiber connector is preferred for use in data transmission between electronic devices due to its high transmission speed and signal integrity. The optical fiber connector includes a connector body, optical fibers, blind holes defined in the connector body for receiving the optical fibers, a cover assembled in the connector body to fix the optical fibers, and optical lenses aligned with the respective optical fibers.

When the optical fiber connector is assembled, the optical fibers are inserted into the respective blind holes, the cover is assembled into the connector body to contact the optical fibers, glue is dropped around the cover to fix the cover in the connector body while the cover is subjected to pressure. However, the cover is easily moved, disturbing the mass of optical fibers. This vulnerability may decrease transmission efficiency and degrade signal integrity.

Therefore, it is desirable to provide an optical fiber connector, which can overcome or at least alleviate the limitations described.

DETAILED DESCRIPTION

Figure 1:
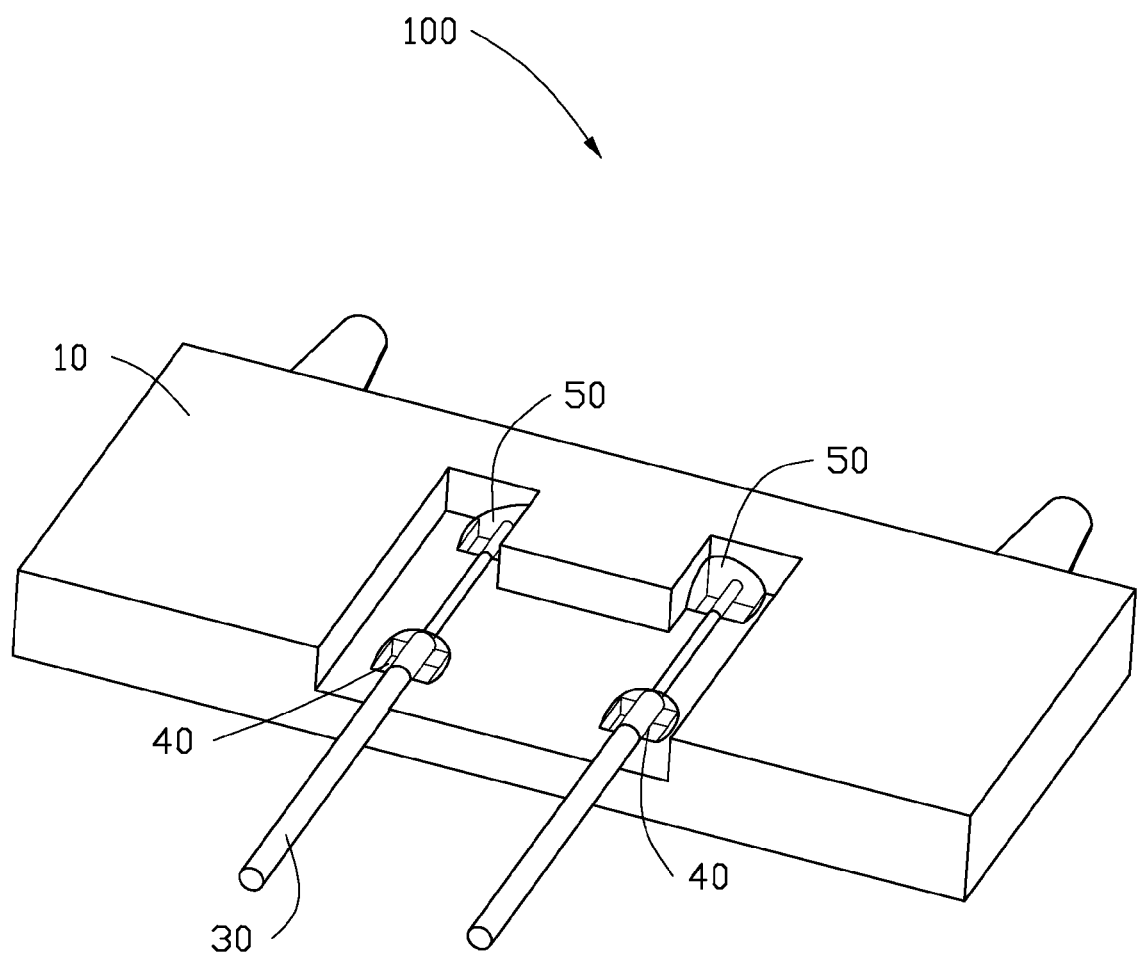
FIG. 1 is an isometric view of an optical fiber connector including a connector body, according to an exemplary embodiment.

Referring to FIG. 1, an optical fiber connector 100, according to an exemplary embodiment, includes a connector body 10, two optical fibers 30, two first glue layers 40, and two second glue layers 50.

Figure 2:
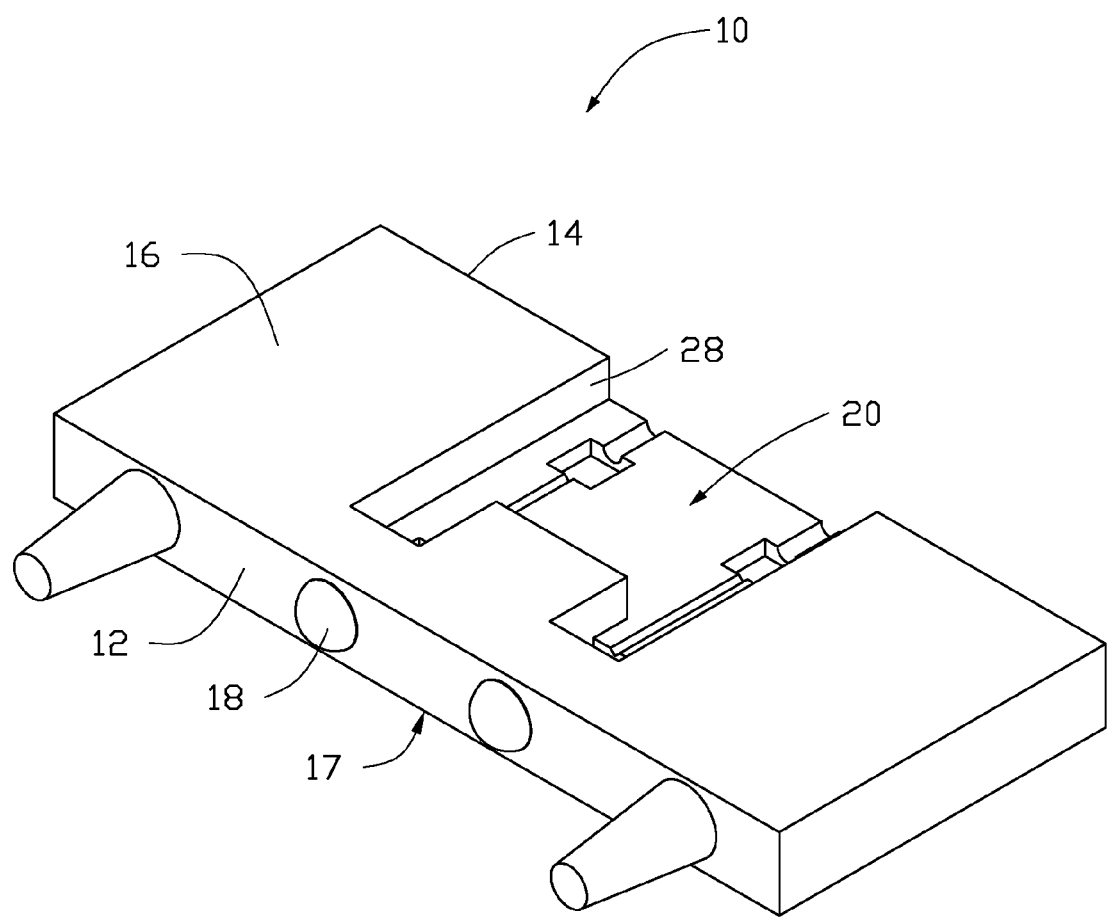
FIG. 2 is an isometric view of the connector body of FIG. 1.
Figure 3:
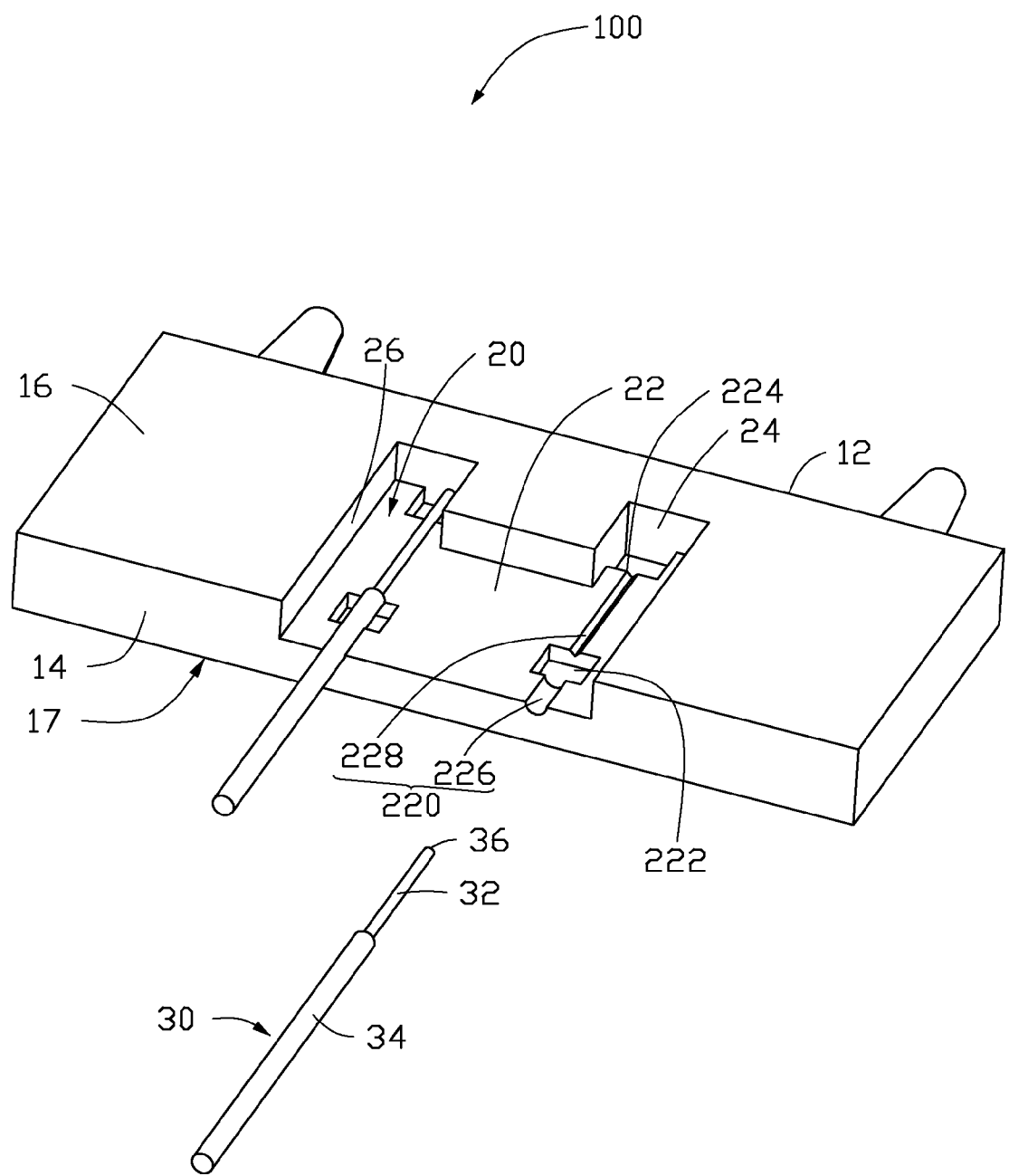
FIG. 3 is an exploded view of the optical fiber connector of FIG. 1.

Referring to FIGS. 2-3, the connector body 10 is substantially cuboid and transparent. The connector body 10 includes a first side surface 12, a second side surface 14, an upper surface 16, a lower surface 17, and two optical lenses 18. The first side surface 12 is substantially parallel to the second side surface 14. The upper surface 16 is substantially parallel to the lower surface 17. The upper surface 16 is perpendicularly interconnected between the first side surface 12 and the second side surface 14. The lower surface 17 is perpendicularly interconnected between the first side surface 12 and the second side surface 14. The optical lenses 18 are formed on the first side surface 12.

The connector body 10 includes a top recess 20 defined in the upper surface 16, and a bottom surface 22, a inner front surface 24, a first inner side surface 26, and a second inner side surface 28. The bottom surface 22, the inner front surface 24, the first inner side surface 26, and the second inner side surface 28 are defined in the top recess 20. The bottom surface 22 is substantially parallel to the upper surface 16. The inner front surface 24, the first inner side surface 26, and the second inner side surface 28 perpendicularly extend from three edges of the bottom surface 22 and terminates at the upper surface 16. The inner front surface 24 is substantially parallel to the first side surface 12 and is apart from the first side surface 12. The first inner side surface 26 is substantially parallel to the second inner side surface 28. The inner front surface 24 perpendicularly connects the first inner side surface 26 to the second inner side surface 28. The bottom surface 22, the first inner side surface 26, and the second inner side surface 28 perpendicularly extend from the second side surface 14 and terminates at the inner front surface 24.

The bottom surface 22 defines two receiving grooves 220 for receiving the two optical fibers 30, two first recesses 222, and two second recesses 224. Each receiving groove 220 is aligned with a first recess 222 and a second recess 224. Each receiving groove 220 includes a first receiving groove portion 226 and a second receiving groove portion 228. The first receiving groove portion 226, the first recess 222, the second receiving groove portion 228, and the second recess 224 are arranged in sequence along a direction from the second side surface 14 to the first side surface 12. The first receiving groove portion 226 passes through the second side surface 14. The first recess 222 is in communication with the first receiving groove portion 226 and the second receiving groove portion 228. The second recess 224 communicates with the second receiving groove portion 228 and is bounded by the inner front surface 24. In this embodiment, the first recesses 222 and the second recesses 224 are cuboid, the first receiving groove portions 226 are semicircular in cross-section, and the second receiving groove portions 228 are V-shaped in cross-section.

In other embodiments, the first recesses 222 and the second recesses 224 may be other shapes in cross-section, such as arc-shaped. The second receiving groove portions 228 may be semicircular in cross-section.

The two optical fibers 30 are received in the two receiving grooves 220 respectively and are aligned with the two optical lenses 18, respectively. Each optical fiber 30 includes a main portion 34 and a front portion 32. The main portion 34 consists of a core portion and a cladding portion surrounding the core portion. The front portion 32 consists of an exposed core portion proximate to the main portion 34. The front portion 32 is slightly shorter than the main portion 34. The first receiving groove portion 226 conforms to the main portion 34 and is configured for receiving the main portion 34. The second receiving groove portion 228 matches with the front portion 32 and is configured for receiving the front portion 32.

Referring to FIGS. 1-3, the material of the first glue layers 40 is ultraviolet (UV) curable resin. The first glue layers 40 fill in the first recesses 222 and engulf the respective optical fibers 30.

The second glue layers 50 are optical matching glue. The second glue layers 50 fills in the second recesses 224 and engulf the respective optical fibers 30.

When the optical fibers 30 are assembled into the connector body 10, the optical fibers 30 are received in the receiving grooves 220. In particular, each main portion 34 is received in the first receiving groove portion 226, each front portion 32 is received in the second receiving groove portion 228, and a distal end surface 36 of the optical fiber 30 contacts the inner front surface 24 and coincides with the focal plane of the optical lens 18. The second glue layers 50 then fill in the second recesses 224 and secure the respective optical fibers 30, and the first glue layers 40 fill in the first recesses 222 and secure the respective optical fibers 30, thereby the optical fibers 30 are fixed in the connector body 10 and cannot move. This reduces incidental light loss, increases transmission efficiency and enhances signal integrity.

In addition, by abutting the distal end surface 36 of the optical fiber 30 against the inner front surface 24, the distal end surface 36 coincides precisely with the focal plane of the optical lens 18, thereby the transmission accuracy is assured.

Even though numerous characteristics and advantages of the present embodiments have been set forth in the foregoing description, together with details of the structures and functions of the embodiments, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. An optical fiber connector, comprising:

a plurality of optical fibers;

a connector body comprising a first side surface, a second side surface parallel to the first side surface, an upper surface perpendicularly interconnected between the first side surface and the second side surface, and a plurality of optical lenses arranged at the first side surface, the connector body including a top recess defined in the upper surface, and a bottom surface in the top recess parallel to the upper surface, an inner front surface in the top recess parallel to the first side surface, a first inner side surface in the top recess, and a second inner side surface in the top recess parallel to the first inner side surface, the inner front surface perpendicularly connecting the first inner side surface to the second inner side surface, each of the bottom surface, the first inner side surface, and the second inner side surface extending from the second side surface toward and terminating at the inner front surface, the bottom surface defining a plurality of receiving grooves, a plurality of first recesses, and a plurality of second recesses, each first recess located between the second side surface and the corresponding second recess and connected with the corresponding receiving groove, each second recess arranged at a distal end of the corresponding receiving groove and bounded by the inner front surface, the optical fibers received in the receiving grooves and aligned with the optical lenses;

two first glue layers filling in the first recesses and engulfing the respective optical fibers; and two second glue layers filling in the second recesses and engulfing the respective optical fibers.

2. The optical fiber connector as claimed in claim 1, wherein each optical fiber comprising a main portion consisting of a core portion and a cladding portion surrounding the core portion, and a front portion consisting of an exposed core portion proximate to the main portion, each receiving groove comprises a first receiving groove portion located between the second side surface and the first recess for receiving the main portion and a second receiving groove portion located between the first recess and the second recess for receiving the front portion.

3. The optical fiber connector as claimed in claim 2, wherein the first receiving groove portion are semicircular in cross-section, and the second receiving groove portion are semicircular in cross-section.

4. The optical fiber connector as claimed in claim 2, wherein the first receiving groove portion are semicircular in cross-section, and the second receiving groove portion are V-shaped in cross-section.

5. The optical fiber connector as claimed in claim 1, wherein a distal end surface of each optical fiber contacts the inner front surface and coincides with the focal plane of the corresponding optical lens.

6. The optical fiber connector as claimed in claim 1, wherein the first glue layers are ultraviolet curable resin, and the second glue layers are optical matching glue.

* * * * *